United States Patent [19]

Burkhart

[11] 4,120,981
[45] Oct. 17, 1978

[54] METHOD OF COOKING FOOD

[76] Inventor: William H. Burkhart, Room 190, 960 San Antonio Rd., Los Altos, Calif. 94022

[21] Appl. No.: 618,779

[22] Filed: Oct. 2, 1975

Related U.S. Application Data

[62] Division of Ser. No. 568,864, Apr. 17, 1975, Pat. No. 4,048,473.

[51] Int. Cl.² .................... A01K 43/00; G01N 33/02
[52] U.S. Cl. .................................. 426/231; 426/233; 426/438; 426/509; 426/523; 426/589; 426/614; 426/637
[58] Field of Search .............. 99/325, 326, 329, 331, 99/330, 334, 342, 343, 348, 409; 426/231, 233, 438–441, 466, 504, 523, 589, 614, 637, 509; 219/385, 386, 389, 390, 399, 432, 433, 440, 441

[56] References Cited

U.S. PATENT DOCUMENTS

| | | | |
|---|---|---|---|
| 1,806,004 | 5/1931 | Tavender | 219/433 |
| 1,880,822 | 10/1932 | Cook et al. | 219/389 |
| 1,980,920 | 11/1934 | Kelly | 219/389 |
| 2,024,062 | 12/1935 | Preedit | 219/389 |
| 2,041,318 | 5/1936 | Berger | 219/399 |
| 2,640,907 | 6/1953 | Morey | 219/433 |
| 2,827,379 | 3/1958 | Phelan | 426/438 |
| 2,827,594 | 3/1958 | Phelan | 426/438 |
| 3,787,594 | 1/1974 | Palmason | 426/438 |

FOREIGN PATENT DOCUMENTS 654,379  6/1963  Italy .......................... 99/348

*Primary Examiner*—Raymond N. Jones
*Assistant Examiner*—Elizabeth A. Hatcher
*Attorney, Agent, or Firm*—Shapiro and Shapiro

[57] ABSTRACT

Significantly improved cooking of food is achieved in machines which tumble the food in a rotating heated vessel. In one embodiment a food-containing vessel rotates past an electric heater which supplies heat to the vessel. The vessel has a cap provided with an axial vent through which a temperature sensing probe may be inserted for automatic temperature control and has means for circulating the vessel contents. A drive motor is coupled to the vessel automatically when the vessel is inserted in a stand or housing. The axis of rotation of the vessel may be inclined, and the inclination may be adjustable.

27 Claims, 8 Drawing Figures

METHOD OF COOKING FOOD

This is a divisional application of Ser. No. 568,864, filed Apr. 17, 1975 now U.S. Pat. No. 4,148,473.

BACKGROUND OF THE INVENTION

This invention relates to the art of cooking food and is more particularly concerned with food cooking machines and food cooking methods which permit even unskilled cooks to prepare a wide variety of foods simply, economically, rapidly, and with consistent success.

Cooking failures especially by relatively inexperienced cooks, are usually caused by one or more of the following conditions: excessive cooking temperature, excessive cooking time, failure to stir continuously. These conditions individually or collectively result in tough meat, fish and poultry; burned foods, sauces, and butter; thick, separated, lumpy, or curdled sauces; soggy vegetables; and overcooked eggs. Conventional cooking utensils, whether of the simple pot and pan variety or the electrified temperature-controlled type, are poorly equipped to alleviate such conditions.

Prior art cooking vessels do not provide sufficiently precise control of cooking temperatures, particularly with respect to control of the rate of boiling. Thus, the cook must either provide excess liquid or keep watching the liquid level to prevent the pan from becoming dry. Excessive amounts of liquid result in loss of nutrients and flavors when excess water is discarded and result in poor economy or efficiency when cooking oil is discarded or recycled after clarification. Heat is usually applied only to the bottom of the cooking vessel, unless complex double boilers, deep-well or oven arrangements are used, and uneven heating and browning of the food is a common problem. The time required to heat the vessel to the desired operating temperature is often longer than the time required to cook the food. Stirring must usually be done manually and with constant attention. Mechanical stirring paddles are impractical, cumbersome, and inapplicable to many foods. Moreover, conventional cooking vessels are large, are not readily accommodated by automatic dishwashers, and are difficult to clean by hand.

Cooking machines, as distinguished from mere heated vessels, have been proposed heretofore. For example, rotary cooking vessels have been proposed for cooking meats, nuts, and other foods. While such devices may have some advantages over conventional cooking vessels and over rotating spits or the like, they do not provide a general purpose high-performance cooking machine. Moreover, they do not provide, in the same machine, high speed cooking, precise temperature control, ease in cleaning, and sufficient versatility to accommodate a wide vareity of foods in essentially automatic, even one-step cooking.

BRIEF DESCRIPTION OF THE INVENTION

It is accordingly a principal object of the invention to provide improved cooking machines and methods which cook a wide variety of foods rapidly, simply, efficiently, tastefully, and largely automatically, and which eliminate the need for hand stirring, prevent accidental burning or overheating, minimize the amount of water or cooking oil needed, minimize the production of smoke in frying and broiling, reduce the number of separate operations required to prepare food which will be served with sauces, reduce the size and the number of utensils needed to prepare a meal and reduce the amount of hand labor needed to prepare a meal and to clean utensils.

A specific object of the invention is to provide a general-purpose cooking machine of great versatility, which is capable of cooking successfully with little attention of the cook.

Briefly stated, one embodiment of the invention employs a rotatable cooking vessel closed at one end and having an open end closed by a removable cap. An electric motor mounted upon a housing or stand is coupled to the vessel automatically when the vessel is inserted in and rotatably supported upon the housing or stand. The rotational axis of the vessel is inclined in one embodiment and the angle of inclination may be adjusted. The vessel is preferably transparent and at least partially exposed to permit viewing of the food during cooking, and the interior of the vessel is provided with means to insure circulation of food and liquid longitudinally of the vessel during cooking. Heat is supplied by an electric heater past which the vessel rotates, and the application of heat is controlled by a temperature sensing probe which measures the temperature inside the vessel and which may be inserted into the vessel through an axial vessel cap vent.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 2:
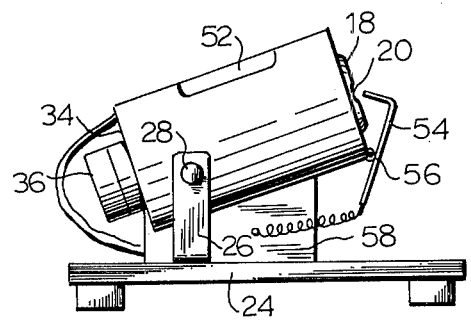
FIG. 2 is a side elevation of the machine.
Figure 3:
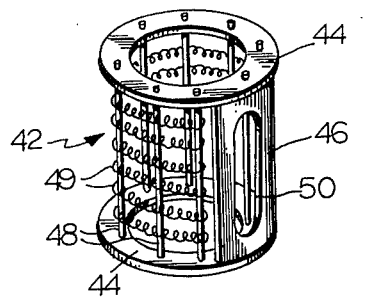
FIG. 3 is a perspective view of the heater assembly.
Figure 4:
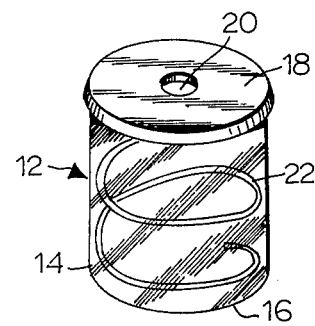
FIG. 4 is a perspective view of the food-containing vessel.
Figure 5:
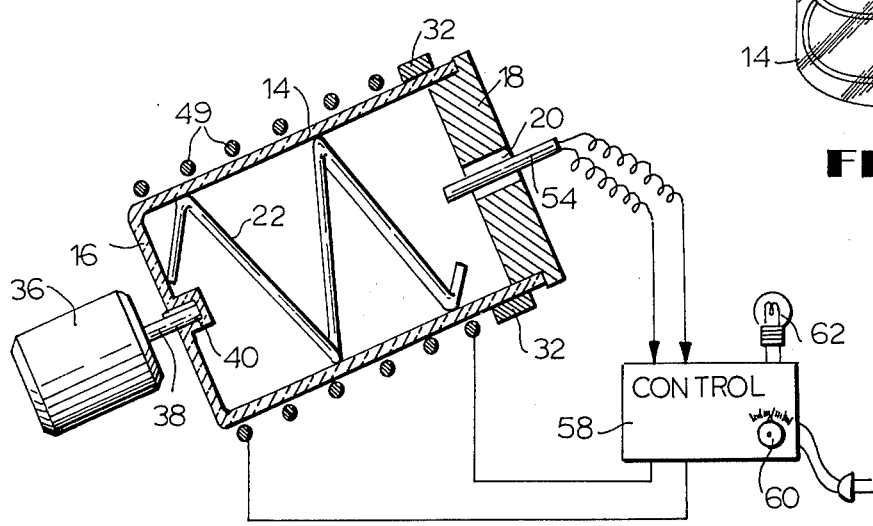
FIG. 5 is a diagrammatic vertical sectional view of a cooking machine in accordance with the invention.

Referring to the drawings, and initially to FIGS. 1-5 thereof, a cooking machine in accordance with the invention may comprise a generally cylindrical housing 10 into which a generally cylindrical food-containing vessel 12 is inserted coaxially. As shown in FIGS. 4 and 5, the vessel has a side wall 14 defining a surface of revolution about the vessel axis and has an end wall 16 closing one end of the vessel. The other end of the vessel is open and is provided with a removable cap 18 for closing the open end. The vessel may be somewhat conical (referred to herein as generally cylindrical) and may be formed of Pyrex glass, ceramic material, or metal, for example, with a cap of silicone rubber, for example. Cap 18 should fit snugly enough to prevent liquid or vapor leakage. The cap is provided with a pressure relief 20, which in the form shown is an axial vent opening through the cap. The inner surface of the vessel side wall is provided with a helical land (or groove) 22 or other means for feeding and circulating solid food and liquid along the length of the vessel, as will appear more fully hereinafter. The land may be a helical nickel wire coil, for example.

Figure 1:
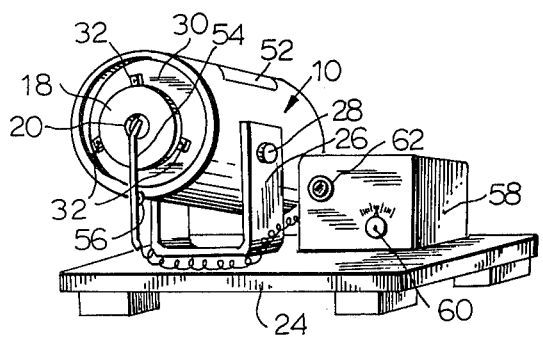
FIG. 1 is a perspective view of a cooking machine in accordance with the invention.

As shown in FIGS. 1 and 2, the housing 10 is supported upon a base 24, such as a horizontal platform on legs. The entire cooking machine is readily portable. In the form shown the housing is mounted upon the base by means of a U-shaped yoke 26, the upright arms of which are provided with screws 28 threaded into the side wall of the housing and providing pivots which permit the elevation angle of the housing to be adjusted (between 0° and 90°, for example) and then to be fixed by tightening of the screws. For most steaming or stir-frying cooking in accordance with the invention, the angle will be set between 10° and 30°.

One end of the housing is provided with an end plate 30 having a large central opening through which the vessel 12 may be inserted into the housing, end wall 16 being inserted first. Surrounding the opening are three equally spaced bearings 32 of Teflon, for example, which engage the side wall of the vessel. The opposite end of the housing is closed by an end wall 34 upon which an electric motor 36 is mounted externally. The drive shaft 38 of the motor (see FIG. 5) passes through an aperture in end wall 34 of the housing and is provided with a spline, key, or other driving means that is automatically coupled to the vessel when the vessel is inserted in the housing. In the form illustrated in FIG. 5, the drive shaft is keyed to a keyway in a receptable 40 formed in the end wall 16 of the vessel. By virtue of the bearings 32 at one end of the vessel and the drive shaft 38 at the other end of the vessel, the vessel is supported for rotaton about its axis in the housing 10, being rotated by the motor 36. Motor 36 may be a gear motor rotating at 30 to 60 RPM, for example.

In order to heat the food within the vessel 12, a heater is provided in the housing 10 around the vessel 12. The heater may be provided by an electric heater assembly 42 as shown in FIG. 3. The heater assembly is generally cylindrical and comprises a pair of flat end rings 44 joined by longitudinal elements 46, including a plurality of insulating rods 48 upon which a resistive hot-wire heating element 49 is supported. The heating element is preferably an exposed nickel-chrome alloy, such as Chromel or Nichrome, and may have a plurality of sections, such as a 400 Watt section and a 600 Watt section. The heater assembly fits concentrically within the housing 10 between the vessel 12 and the housing, with the heating element partially enveloping the vessel therein. The inner surface of the housing 10 is preferably formed of heat reflective material to direct the radiant energy toward the vessel wall. The heater assembly is provided with an opening 50 which is aligned with a window 52 in the side wall of the housing 10. By making the side wall 14 of the vessel 12 transparent, at least in part, as by making the vessel of Pyrex glass, the contents of the vessel may be viewed during cooking. Alternatively, the cap 18 of the vessel may be made of transparent material, such as Pyrex glass, for this purpose.

In order to provide precise control of the temperature of the food within the vessel 12, a temperature-sensing probe 54 is employed. The probe, which may be a thermocouple junction in a ⅛ inch stainless steel tube, for example, is adjustably mounted upon the housing 10, as by a hinge 56, so that it may be substantially aligned with vent opening 20. By virtue of this arrangement, the probe may be turned out of the way to permit insertion of the vessel 12 in the housing 10 and may then be adjusted so that it is set adjacent to the opening 20 in the cap 18, either just outside of the opening (a fraction of an inch therefrom) as shown in FIG. 2 or extending through the opening into the interior of the vessel, as shown in FIGS. 1 and 5. The probe is connected to a control 58, mounted on base 24, for controlling the current supplied to the heating element 49, so as to maintain automatically and precisely the temperature set on an adjustable dial 60. When the sensed temperature is less than the temperature set by the dial, as selected by the cook, control 58 applies power to the heater. When the sensed temperature exceeds the selected temperature by a small margin, the control 58 reduces the amount of power applied to the heater. Control 58 may be equipped with a lamp 62 or other signaling device to indicate to the cook that the desired temperature has been reached. The temperature control 58 may be any conventional type capable of providing the desired preciseness of control. Preferably the control includes a timer which automatically de-energizes the heater or reduces the temperature to a "holding" level after a pre-set time interval, which may commence when the cooking temperature set by dial 60 is initially reached.

To use the cooking machine of the invention, the cooking ingredients are placed in the vessel 12; the capped vessel is inserted in housing 10, as shown in FIG. 1 (probe 54 being first turned out of the way); the motor 36 is energized; and the control 58 set. Probe 54 is then positioned for temperature sensing. When it is desired to tumble the food in accordance with the invention, the vessel should not be packed tightly with food. When the cooking machine is employed for cooking food that is to be steamed, the temperature sensing probe 54 may be placed just outside of the vent opening 20, rather than inside the vessel 12. Measurement of heat inside the vessel requires more accurate sensing means than just outside the vent, since the interior temperature will be 212° F. whether the liquid contents are barely boiling or boiling most vigorously. Temperature measurements made in the air just outside the vent show a substantial change in temperature as the liquid comes to a boil and emerging steam strikes the sensor.

Figure 6:
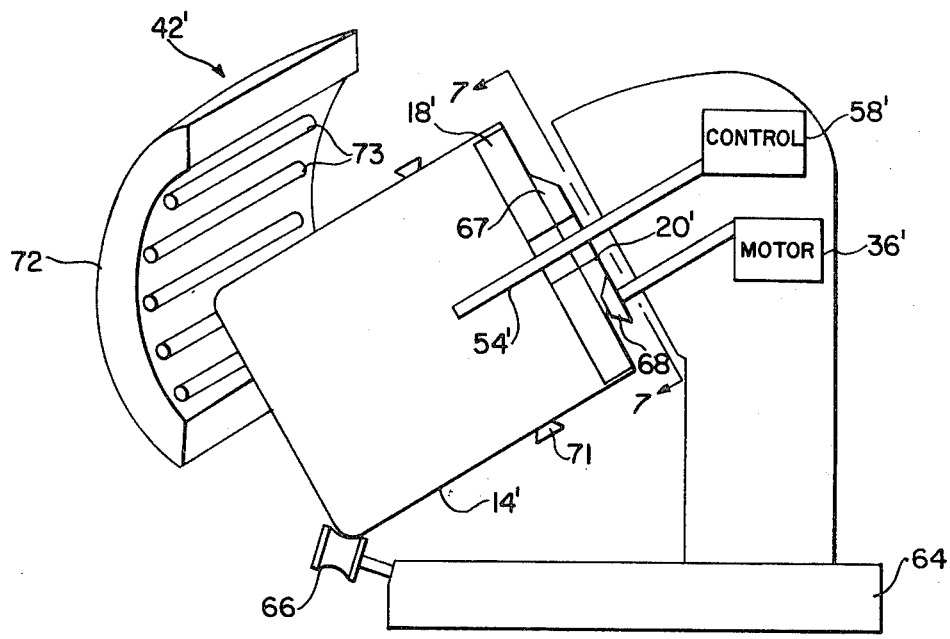
FIG. 6 is a partly diagrammatic exploded view of another cooking machine in accordance with the invention.
Figure 7:
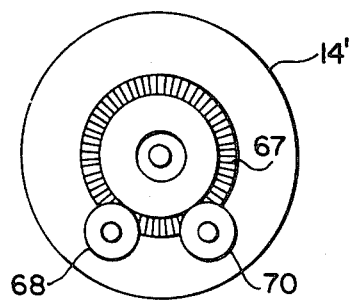
FIG. 7 is a sectional view taken along line 7—7 of FIG. 6.
Figure 8:
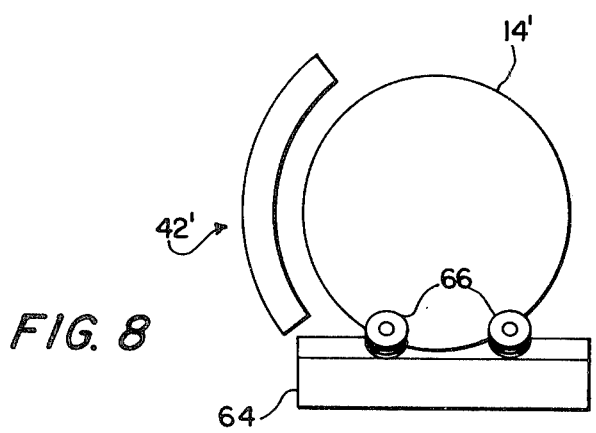
FIG. 8 is an end view of a machine of FIG. 6.

In the embodiment illustrated in FIGS. 6–8, the cooking machine comprises a base or stand 64 for rotatably supporting the food-containing vessel 14'. The closed end of the vessel is supported upon a pair of concave idler wheels 66 rotatably mounted upon the lower part of the stand. The cover 18' of the vessel is formed with a large bevel gear 67 which meshes with a pair of small bevel gears 68 and 70. Gear 68 is driven by a gear motor 66', and gear 70 may be an idler. The engagement of gear 67 with gears 68 and 70 supports the cover end of the vessel, gears 68 and 70 being located under gear 67 as shown in FIG. 7. A temperature sensing probe 54' projects downwardly from the stand and enters the vent 20' as the vessel is inclined and pushed upwardly onto the stand to the position shown in FIG. 6, the closed end of the vessel being dropped onto the idler wheels 66. The vessel may be provided with a dovetail ring 71 to which a handle (not shown) may be clipped to remove the vessel from the stand after the food is cooked. The upper portion of the stand 64 may constitute a housing containing the motor 36' and the thermostatic control 58'.

The heater 42' (shown out of position in FIG. 6 for illustrative purposes) may comprise a heat reflective housing 72 containing high temperature glass (Vycor) tubes 73 with heating coils therein or containing conductive glass tubes. As shown in FIG. 8, the heater 42' is positioned at one side of the vessel (mounted upon the stand) with the heater elements parallel to the length of the vessel and preferably spaced equally from the side wall of the vessel. Thus, as the vessel rotates past the heater, the vessel is heated uniformly, and there is no chance that food or liquid will spill upon the heater. In the form shown the heater envelops about 120° of the circumference of the vessel.

Three of the most important attributes of the invention are: (1) accurate temperature control, (2) speed of operation, and (3) ease of cleaning, and these attributes and the structures responsible therefor are interrelated. In accordance with the highly preferred form of the invention, the temperature is sensed inside the vessel (and/or just outside the vent where the temperature of emitted steam is directly related to the temperature of the gases inside the vessel). By employing a temperature sensing probe which extends inside the vessel, rather than in contact with an outer surface of the vessel, simpler, more accurate, and even less expensive temperature control is possible. If the probe were to contact the outer surface of the vessel wall, there would be a wear problem as well as difficulty in obtaining accurate representations of the food temperature. Suppose that it were desired to provide rapid cooking by steaming, for example. To get heat to pass through the walls of the vessel rapidly, it is necessary to have a much higher temperature outside than inside, and for fast heat transfer the outside surface of the walls will be much hotter than the inside surface (unless, of course, the vessel were formed of highly conductive metal). Energizing the heater to provide high temperature of say 1500° F., the outside of the vessel would soon reach 212° F., but the food inside would still be cold. Because the cool food will condense the steam, the interior of the vessel will be kept cooler than the walls. With the temperature sensor measuring the temperature of the outside surface of the vessel, the heat would be turned off prematurely, or if intense heating continued, the water inside the vessel might be boiled away rapidly.

With the temperature sensor extending inside the vessel through the vent opening, proper boiling can be easily achieved. By virtue of the invention, one end of the sensor probe may be placed inside the vessel and one end outside. As vigorous steam generation occurs, the steam exits from the vent and heats the exterior end of the probe. Thus, the probe as a whole "sees" a higher temperature when boiling is vigorous than when it is gentle, making possible a simple temperature control responsive to the magnitude of boiling.

A sensor extending probe extending inside the vessel need not be as accurate as one employed to measure the temperature of the vessel wall, and if the probe is located just outside the vent, it need be even less accurate for satisfactory operation. A temperature probe attempting to measure the temperature of the outside surface of an aluminum vessel wall, for example, would have to be much more tightly coupled to the wall than through the air in the vicinity of the wall if it were desired to measure the temperature accurately enough for satisfactory operation and without errors due to variations in room temperature. Moreover, even if an aluminum wall were employed to minimize the difference in temperature between the inside and outside surfaces of the wall, it would not be possible to depend upon a fixed drop in temperature through the wall to calculate the temperature inside, because the difference in temperature depends upon the amount of heat being taken away from the inside of the wall by the contents of the vessel.

With the temperature sensor inside the vessel, information as to the food condition can be obtained. For example, when potatoes are fried in the rotating vessel, the oil may be at 390° F., but the vapor above the oil will be at 212° F. so long as the potatoes are giving off steam. When the interior temperature reaches 390°, the potatoes are brown. Thus the sensor can actuate an alarm when the temperature reaches 390° to indicate that the potatoes are done or almost done. Sensing temperature outside the vessel would cause the heat to be turned off much sooner, and the heat would be cycled on and off before the food reached 390°. This means much slower cooking.

The temperature sensing probe need not contact the food vessel or its contents, preferably being located in the vessel away from the vessel walls. In cooking in aqueous media, the amazing ability of steam to unload heat copiously means that the vapor temperature in the vessel and the food surface temperature during steaming are substantially the same (212° F.). Even at temperatures below 212° F., as in the preparation of Hollandaise sauce, the gas temperature is substantially the same as the liquid temperature, because of the constant stirring and contact of the gas with the wet walls. With tumbling and stirring in a substantially closed container (and the vessel is substantially closed except for the vent), the gas and food surface temperatures will be about the same. Thus the temperature of the surface of the food and the temperature of liquids in the vessel can be effectively measured by measuring the gas temperature.

In conventional cooking, fast cooking is difficult. When high heat is applied in an effort to cook rapidly, the starch in viscous fluid sauces may thicken the fluid too much. Then the gooey fluid will burn where it touches the hot surface of the cooking vessel. Constant stirring helps, of course, but it is common practice to add flour last in an effort to avoid this problem.

It takes a long time to heat a pot of water — about 5 minutes to heat a quart of water and another 5 minutes to cook most vegetables if they are cut into reasonably small size pieces. Steaming is faster than boiling, because it is only necessary to heat a relatively small amount of water. But the high heat which will bring the water to a boil quickly will also boil it away quickly. The the food will burn. Watchful waiting and turning the heat down when the water begins to boil helps, and as the food gets hot, the heat must be lowered again. This is troublesome for the cook, so steaming is not very popular.

It takes several minutes just to heat a heavy pan. Cooks prefer heavy pans and put up with slow heating, because it is easier to overheat and burn food in a thin pan.

High heat is necessary for fast cooking, but heat control is also essential. Very fast heat is required to get up to cooking temperature, and then slow controlled heat is required to keep the water from boiling away, to keep oil from smoking, and to keep the food from burning.

In the preferred form, the present invention employs heaters and cooking vessels with low thermal mass (weight times specific heat). The use of radiant heaters (such as low thermal mass nichrome elements) and a Pyrex glass cooking vessel (glass having lower specific heat than metal) provides better heat control than if Calrod heaters and aluminum vessels were employed and minimizes the temperature overshoot problems caused by the use of inexpensive thermostats. In accordance with the invention, it is thus possible to employ an intense source of heat such as the maximum wattage resistive heating element permitted by local codes and Underwriters Laboratories.

High speed and accurate temperature control are only attainable when mixing is provided to assure an even distribution of temperature within the food mass. Microwave heating heats the food internally, of course, but is expensive. A stirring paddle is not satisfactory because it can damage foods and it cannot be used with very viscous liquids (semi-solids) like eggs or cakes once they begin to harden. By rotating the vessel, constant stirring and tumbling of the food and uniformity of heating can be insured, greatly reducing the possibility of overheating or burning. With the vessel rotated about an axis inclined with respect to horizontal, some means, such as the helical land 22, may be employed for feeding and circulating the food and liquid longitudinally of the vessel to insure highly effective tumbling and stirring, the food and liquid advancing upwardly toward the vessel cap and then falling downwardly toward the closed end of the vessel. With the capped end of the vessel higher than the other end, it is unnecessary to provide exceptionally tight seals to avoid leakage, and with the vent 20 located in the elevated cap and located axially, the problem of leakage through the vent is solved. If the vessel is rotated about a horizontal axis, it is necessary to have a tight seal between the cap and the vessel, and more care must be taken to avoid liquid leakage through the vent. With a leak-proof cap, the vessel can be mounted for rotation about a horizontal axis, and the spiral land or groove replaced with agitating protuberances or depressions to tumble the food. The total capacity of a tilted vessel for solids is greater than for a vessel rotated about a horizontal axis. For example, a souffle made in a horizontal vessel would expand and flow out the vent hole. However, if the angle of inclination is too great, insufficient liquid may reach the cap, so that the upper portion of the vessel may be cooled insufficiently by liquid and tend to overheat. In any event, tumbling the food in a substantially closed container insures better heat distribution and mixing of ingredients, better retention of flavors, avoids food damage, and is applicable to the cooking of most foods.

Tumbling of food in a substantially closed container with controlled heating in accordance with the invention permits the use of a minimal amount of liquid and insures minimal loss of liquid. In the use of the invention, an ounce of water is sufficient for cooking half a liter (pint) of vegetables. A ratio of one ounce of water to 32 ounces of food is typical. The problem of employing small amounts of liquid in conventional cooking is that the liquid is inadequate to coat the entire surface of the cooking vessel, and the liquid is rapdily volatilized because of poor heat control. If the liquid fails to coat the entire surface in contact with the food, some part of the surface will get hotter than 212° F., for example, and if food (especially starch) contacts that spot, it will stick and burn. By rotation of the vessel and careful heat control in accordance with the invention, the fluid is well distributed and heat can be applied at a much higher rate than with conventional cooking. In conventional cooking, the necessary use of large quantities of liquid dictates long heating times and dilution of juices.

In the invention only a single cooking vessel need be employed. Ease of cleaning is promoted by the use of smooth vessel surfaces (any lands may be separable from the vessel), by the prevention of leadkage to the outside walls, and by the even distribution of heat to prevent burning. Evenness of heating is essential, as pointed out previously. Many foods go from liquid to solid state as they pass some temperature point. Eggs, flour, and foods which use these, such as Hollandaise, omelet, souffle, and all sorts of cakes have this characteristic. Without the use of microwaves, it is impossible to heat such foods quickly without mixing or stirring, for a thick stiff insulating layer will form on the vessel walls. As this layer is dry and insulating, the walls will get hotter and hotter, and the layer will burn. Meanwhile the interior of the food will still be uncooked liquid. Since cakes, for example, cook at 212° F., why not cook them in a 212° F. over? The obvious answer is that it takes an inordinate amount of time to heat anything to the same temperature as the heater. Then why not a 500° F. oven? The answer is that the batter on the bottom and side of the cake pan will burn black before the inside is cooked (dry). Similarly, a sauce such as plain roast beef gravy with flour or cornstarch (to thicken it) will cook first on the vessel wall and get too thick. Then it becomes an insulator and burns. Once uneven temperature sets in, burning is inevitable. With the invention, much more careful control of heat is possible and much more even distribution of heat is possible, so that the foregoing condition can be avoided. Also, just as modern self-cleaning ovens are cleaned by raising their wall temperature to a level at which carbon oxidizes, so the vessels of the invention, if formed of an appropriate material such as pyro-ceramic material, may be cleaned by heating them to a high temperature to oxidize carbon residues.

As pointed out above, it is preferred to employ hot wire resistance heaters of low thermal mass outside the vessel. The heater is preferably placed close to the side wall of the vessel within a heat-reflecting surface of a housing (which may be insulated beyond that surface, of course) for efficient heat transfer. Within the broader aspects of the invention, a vessel with a thin film (tin oxide) resistive coating on the inside or outside wall of the vessel could be employed for heating, or the vessel could be made of conductive glass, aluminum, or steel. Under appropriate conditions, electromagnetic waves or magnetic flux could be employed for heating.

Although vessels which are a surface of revolution about the axis of rotation are preferred, the vessels may have triangular, square, or other cross-section, rather than round, and truncated conical or pyramidal vessels may be employed for ease of stacking.

With the cooking machines of the invention, it is practical to steam foods in fluids such as wine, soy sauce, or sweet and sour sauce as well as in water. Because only a teaspoon or two of liquid is lost as steam through the vent during cooking of meats and vegetables, the cooking process may be started with only one or two tablespoons of liquid. Using a minimum of liquid, the invention will bring the contents of the vessel to the point of steaming in as little as two minutes, the exact time being dependent upon the type of food, the ratio of area to volume of each piece of food, and power input to the heater. When butter, salt and other spices or sauces are added initially, the food prepared by tumbling and steaming in accordance with the invention is ready to serve as soon as it is tender. The residual liquid is poured over the food as a sauce. A significant advantage of the invention is that most foods can be cooked efficiently by steaming or stir-frying.

In stir-frying (sauteeing) oil, rather than steam, is used to carry heat to the food. The oil may also impart flavor if it contains ingredients such as onion or garlic. In the cooking machines of the invention, the food is not stirred manually, as is usually the case. Instead, it is tumble fried as the pieces of food are continuously tumbled and rotated within the vessel, the walls of which become coated with a film of hot oil. Stir frying proceeds in much the same way as steaming. The differences are that the temperature sensor can not be placed outside the vent; it must be inserted into the vessel interior; and the temperature control is set for a suitable temperature in the range of from 300° F. to 400° F., the exact temperature being determined by watching for the desired shade of brown or by a signal triggered when the temperature reaches a preset value (lamp 62 and/or a buzzer may be employed for this purpose). Stir frying in this manner in accordance with the invention has been found to be equivalent to deep frying in the sense that stir fried food looks and tastes the same as deep fried food. French fried potatoes, for example, may be made by tumble frying in a few tablespoons of oil. Less time is required than in deep frying, it being necessary only to heat a small quantity of oil. The potatoes seem to cook as rapidly in stir frying according to the invention as they do in conventional deep frying.

Customarily, vegetable dishes such as asparagus with Hollandaise sauce are made in several steps. The vegetable is normally boiled in water until tender while at the same time the cook melts butter in one vessel and whisks warm water, lemon juice, and egg yolk in another. Next the melted butter is gradually added to the egg, water, lemon mixture as all ingredients are stirred constantly and as heat is applied to the mixing vessel. Up to 150° F. nothing seems to happen; then at approximately 155° F. the sauce thickness to the ideal viscosity. Further heating to 160° F. will curdle the sauce; however, the sauce may be kept for a long period if the temperature is maintained below 150° F. Using the cooking machines of the invention, vegetables with Hollandaise sauce can be made in one vessel in two steps as follows: in the first step all of the ingredients (vegetable, butter, lemon, water, and spices, if any) are steamed for about three minutes, during which the vegetable becomes tender. The vessel is then removed from the housing and the contents allowed to cool to a point below 150° F. In the second step egg yolk is added and the vessel returned to the housing, with the temperature control set to 155° F. When the contents reached 155° F., the sauce thickens and the contents can either be served immediately or left to tumble in the Hollandaise sauce until the cook wishes to serve the dish. Similarly, other foods made with other sauces can be made in one or two steps. Beef stroganoff, for example, can be made in one step, as none of its ingredients will be damaged at the steaming temperature (212° F.). Where ingredients, such as eggs and milk, cannot withstand high temperatures, there are added in the second step after the primary ingredients have been cooked and partially cooled.

Hollandaise sauce can be made in accordance with the invention by tumbling water, lemon juice, and egg yolk (salt and pepper too) and butter in the vessel, starting all together and all cold, and heating to 155° F., at which point the sauce thickens. An omelet can be made by tumbling an egg and some butter and whatever other ingredients are desired (such as ham, cheese, mushrooms, etc.) and continuing to apply heat intensely until the vessel interior reaches a temperature of 212° F. Because little liquid is lost in vented steam, sauces containing cornstarch or flour can be made with the cornstarch or flour combined with the other ingredients at the beginning of the cooking process. If the sauce is just the right thickness when it comes to a boil, it will remain at that thickness because little water is lost in steam. Thus, one-step cooking is possible, with all ingredients being put in cold and at the same time. Fast cooking in the substantially closed vessel of the invention, with immediate serving, heightens the flavor.

As noted above, the present invention permits accurate heating cut-off (as at the temperature at which a food becomes quite viscous) and insures proper cooking. For most foods, the cut-off temperature is about 212° F. in steaming and about 375° F. to 390° F. in stir-frying. Attainment of a predetermined interior temperature of the vessel serves as a signal to indicate completion of cooking or to start a timer which terminates heating after a predetermined interval and which actuates an alarm. The temperature sensing probe may incorporate several thermostatic elements which trip at predetermined critical temperature points, such as 150° F. (for eggs), 212° F. (for steaming), and 375° F. (for frying). With four or five pre-set thermostats, any recipe could be cooked merely by closing a switch to activate one of the thermostats.

While preferred forms of the invention have been shown and described, it will be apparent to those skilled in the art that changes can be made therein without departing from the principles and spirit of the invention, the scope of which is defined by the following claims.

The invention claimed is:

1. A method of cooking food which comprises tumbling the food in the presence of some liquid in a rotating vessel that is liquid-impervious except for a vent opening in a removable cap closing one end of the vessel and thereby stirring the contents of the vessel, distributing the liquid over a substantial portion of the inner surface of the vessel and promoting an even temperature distribution of the vessel contents, preselecting a desired temperature for the food to be cooked applying heat to the contents of the vessel sufficient to cause gases to be evolved, venting said gases from the vessel through said vent opening while the vessel is rotated with heat applied thereto and while retaining in the vessel the distributed liquid that is not gasified and vented, measuring the temperature of the evolved gases and thereby effectively measuring the surface temperature of the food and the temperature of the liquid in the vessel, automatically controlling the heat applied in accordance with the measured temperature of said gases, and automatically producing a signal when said pre-selected temperature is reached in order that the applicaton of heat may thereafter be reduced sufficiently to terminate cooking of food in the vessel when the food has been properly cooked.

2. A method in accordance with claim 1, wherein the food to be cooked comprises a potato and wherein pieces of potato and a relatively small quantity of oil are placed in the vessel.

3. A method in accordance with claim 2, wherein the application of heat is reduced when the measured temperature reaches a predetermined temperature in the range of about 370° F. to 390° F.

4. A method in accordance with claim 2, wherein the temperature of the gases is measured inside the vessel.

5. A method in accordance with claim 1, wherein the food to be cooked comprises an egg and wherein the contents of an eggshell and some fat are placed in the vessel.

6. A method in accordance with claim 5, wherein the temperature of the gases is measured inside the vessel.

7. A method in accordance with claim 1, wherein the food to be cooked comprises a sauce and wherein egg yolk, lemon juice, fat, and water are placed in the vessel.

8. A method in accordance with claim 7, wherein the temperature of the gases is measured inside the vessel.

9. A method in accordance with claim 8, wherein the application of heat is automatically controlled to limit the temperature inside the vessel to about 155° F.

10. A method in accordance with claim 1, wherein solid food to be cooked, water, lemon juice, and fat are placed in the vessel, wherein the application of heat is initially controlled to limit the temperature in the vessel to about 212° F., thereafter the application of heat is reduced to lower the temperature inside the vessel to below about 150° F. and egg yolk is placed in the vessel, and then further heat is applied to the vessel and the application of heat is controlled to limit the temperature inside the vessel to about 155° F.

11. A method in accordance with claim 10, wherein the temperature of the gases is measured inside the vessel.

12. A method in accordance with claim 1, wherein the food to be cooked is a sauce and wherein the ingredients for producing the sauce, including starch, are placed in the vessel.

13. A method in accordance with claim 12, wheren the temperature of said gases is measured inside the vessel.

14. A method in accordance with claim 1, wherein the temperature of said gases is measured as the gases escape from the vessel through the vent opening.

15. A method in accordance with claim 1, wherein the food is tumbled in a relatively small quantity of liquid.

16. A method in accordance with claim 15, further comprising feeding the food and liquid along the length of the vessel during the tumbling.

17. A method in accordance with claim 1, wherein the vessel is rotated about an axis forming an acute angle relative to horizontal.

18. A method in accordance with claim 17, further comprising adjusting the angle of the rotational axis of the vessel relative to horizontal.

19. A method in accordance with claim 1, wherein the vessel is placed upon a rotational support prior to rotation, and wherein the vessel is coupled to rotating means when so supported.

20. A method in accordance with claim 1, wherein the temperature of said gases is measured by means of a probe away from the walls of the vessel.

21. A method in accordance with claim 20, wherein said vessel is rotated about an axis aligned with said vent opening, and wherein said probe is adjusted so as to be substantially in alignment with said opening.

22. A method in accordance with claim 21, wherein the probe is inserted into said vessel through said vent opening.

23. A method in accordance with claim 1, wherein said signal is produced a predetermined time after the measurement of said predetermined gas temperature.

24. A method in accordance with claim 23, wherein said time is adjusted in accordance with the type of food to be cooked.

25. A method in accordance with claim 1, wherein the ratio of liquid to solid food is of the order of 1:32.

26. A method in accordance with claim 1, wherein the vessel has a glass outer wall and wherein heat is applied to the contents of the vessel through said wall from a low thermal mass resistance type electric heater.

27. A method in accordance with claim 1, wherein the vent opening is located centrally on the cap and on the axis of rotation of the vessel, and wherein the cap is elevated at least as much as the opposite end of the vessel.

* * * * *